United States Patent
Kuo et al.

(10) Patent No.: US 12,422,686 B2
(45) Date of Patent: Sep. 23, 2025

(54) SMART GLASSES AND WEARABLE SYSTEM

(71) Applicants: Asphetek Solution (Chengdu) Ltd., Chengdu (CN); Asphetek Solution Inc., Hsinchu (TW)

(72) Inventors: Yu-Pi Kuo, Hsinchu (TW); Chung-Wu Liu, Hsinchu (TW)

(73) Assignees: Asphetek Solution (Chengdu) Ltd., Chengdu (CN); Asphetek Solution Inc., Hsinchu (TW)

( * ) Notice: Subject to any disclaimer, the term of this patent is extended or adjusted under 35 U.S.C. 154(b) by 0 days.

(21) Appl. No.: 18/616,445

(22) Filed: Mar. 26, 2024

(65) Prior Publication Data

US 2025/0180914 A1    Jun. 5, 2025

(30) Foreign Application Priority Data

Dec. 2, 2023   (CN) .......................... 202311651070.9

(51) Int. Cl.
    *G02B 27/01* (2006.01)
(52) U.S. Cl.
    CPC .. *G02B 27/0176* (2013.01); *G02B 2027/0178* (2013.01)

(58) Field of Classification Search
    CPC ................... G02B 27/0176; G02B 2027/0178
    See application file for complete search history.

(56) References Cited

U.S. PATENT DOCUMENTS

| | | | |
|---|---|---|---|
| 2022/0201388 A1* | 6/2022 | Zhao | G02C 11/06 |
| 2023/0141946 A1* | 5/2023 | Zhang | H04R 1/1008 |
| | | | 381/381 |
| 2023/0240611 A1* | 8/2023 | Khaleghimeybodi | A61B 5/01 |
| | | | 600/301 |
| 2024/0126364 A1* | 4/2024 | Olgun | G06F 3/015 |

* cited by examiner

*Primary Examiner* — Sahlu Okebato
(74) *Attorney, Agent, or Firm* — ScienBiziP, P.C.

(57) ABSTRACT

A smart glasses comprises a glasses body, a vocal unit, a receiving unit, and a control unit. The vocal unit is arranged in the glasses body. The vocal unit comprises a piezoelectric material layer. The piezoelectric material layer is configured to receive drive signals and convert the drive signals into first acoustic signals and/or second acoustic signals. The second acoustic signals are configured to detect vital sign parameters of a human body. The receiving unit is arranged in the glasses body. The receiving unit is configured to receive feedback signals of the human body with respect to the second acoustic signals. The control unit is configured to output the drive signals. The control unit is further configured to determine the vital sign parameters of the human body based on the feedback signals. A wearable system is also provided.

16 Claims, 6 Drawing Sheets

SMART GLASSES AND WEARABLE SYSTEM

FIELD

The subject matter herein generally relates to wearable system.

BACKGROUND

Nowadays, smart glasses use traditional loudspeakers including magnetic coil and magnet to achieve sound transmission. Through the magnetic coil and the magnet, vibration and sound are generated. As the functions of smart glasses become more multifunctional, a battery power of the smart glasses also needs to be increased accordingly, resulting in an increase in battery volume. However, the internal space of smart glasses is limited, and the increase of battery volume may compress the design of the speaker portion, which may increase difficulty in designing the smart glasses.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1:
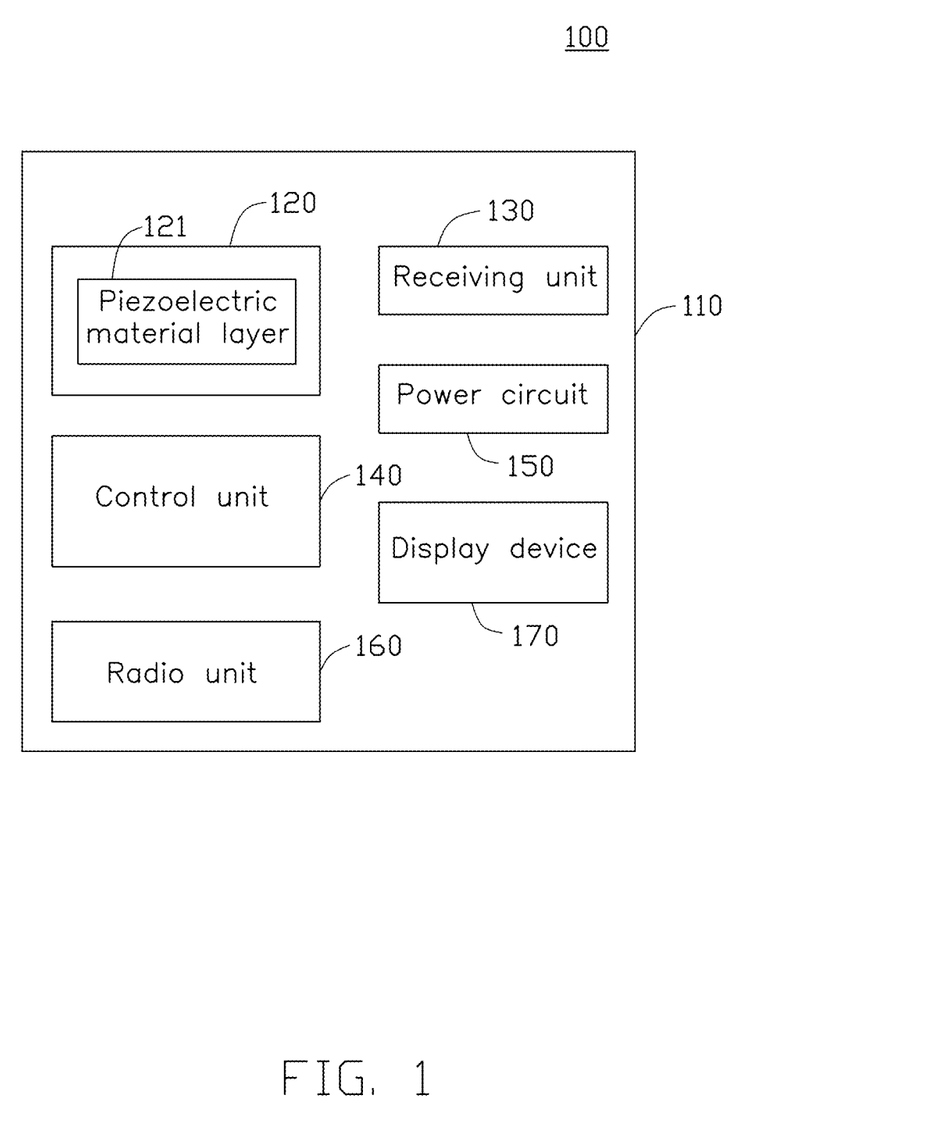
FIG. 1 is a block diagram of a smart glasses in one embodiment of the present application.

FIG. 1 is a block diagram of a smart glasses 100 in one embodiment of the present application. The smart glasses 100 includes a glasses body 110, a vocal unit 120, a receiving unit 130, and a control unit 140. The vocal unit is arranged in the glasses body 110. The vocal unit 120 includes a piezoelectric material layer 121. The piezoelectric material layer 121 is configured to receive drive signals and convert the drive signals into first acoustic signals and/or second acoustic signals. The second acoustic signals are configured to detect vital sign parameters of a human body. A frequency of the second acoustic signals is greater than a frequency of the first acoustic signals. The receiving unit 130 is arranged in the glasses body 110. The receiving unit 130 is configured to receive feedback signals of the human body with respect to the second acoustic signals. The control unit 140 is electrically connected with the vocal unit 140 and the receiving unit 130. The control unit 140 is configured to output the drive signals. The control unit 140 is further configured to determine the vital sign parameters of the human body based on the feedback signals.

In one embodiment, taking an advantage of a mechanical deformation of piezoelectric materials under an action of electric field, the piezoelectric material layer 121 can be deformed and vibrated by applying a suitable voltage at both ends of the piezoelectric material layer 121, and realize the conversion of electrical signals to acoustic signals. Among them, the deformation of the piezoelectric material layer 121 is proportional to the electric field strength.

The vocal unit 120 can be arranged to fit to a human epidermal, for example, near the ear bone. The control unit 140 can output the driving signals to the piezoelectric material layer 121 according to the required output sound information, driving the piezoelectric material layer 121 to deform and generate vibration to output the first acoustic signals. The first acoustic signals can be transmitted to the auditory nerve through bone conduction, or the first acoustic signals can be transmitted to the ear drum through the air, and then transmit to the auditory nerve through the ear drum.

When vital sign parameter detection is required, the control unit 140 outputs the driving signals to drive the deformation of piezoelectric material layer 121 to vibrate and output second acoustic signals. The second acoustic signals can be transmitted to the blood vessel through the human skin, and the corresponding feedback signals are generated according to the state of the blood vessel and transmitted to the receiving unit 130. The control unit 140 can determine the vital sign parameters of the human body according to the feedback signals.

The vital sign parameters include heartbeat and/or blood pressure. For example, when blood vessels are in different states (such as tightening or opening), the frequency of the feedback signals generated by the second acoustic signals is also different. The control unit 140 can determine the tightness or opening degree of blood vessels according to the frequency of the feedback signals, and then determine the human blood pressure, heartbeat and other vital sign parameters. Among them, the receiving unit 130 can be fitted to the human skin to receive the feedback signals of the second acoustic signals and reduce the loss caused by the feedback signals propagating in the air. The frequency of the second acoustic signals is greater than the frequency of the first acoustic signals. For example, the first acoustic signals are the sound frequency that the human body can hear (20-20000 Hz), and the second acoustic signals can be ultrasonic (2000-40000 Hz). The control unit 140 can be implemented with chips with control functions such as microprocessor and Field Programmable Gate Array (FPGA). Further, the number of the piezoelectric material layer 121 can be two. The control unit 140 can control the two piezoelectric material layers 121 to generate the first acoustic signals and second acoustic signals respectively. The embodiments do not limit the number of the piezoelectric material layer 121.

In one embodiment, the smart glasses 100 can also include a display device 170. The control unit 140 is further configured to output display control signals based on the vital sign parameters. The display control signals is configured to control the display device 170 to display the vital sign parameters.

The control unit 140 can also convert the vital signs parameters of the human body (such as blood pressure and heartbeat of the human body) into corresponding numerical signals, and output the numerical signals to the display screen of smart glasses 100 to control the display screen to display the values of vital signs parameters (such as blood pressure and heartbeat), so that users can observe their heartbeat and blood pressure changes at any time. Among them, the display device 170 can be a display screen, and the display screen can be arranged on the lens of the glasses body 110.

In one embodiment, the smart glasses 100 can be Augmented Reality (AR) glasses, or other types of glasses.

Through the piezoelectric material layer 121, the drive signals can be converted into the first acoustic signals and/or the second acoustic signals to realize the speaker function of the smart glasses 100, and the vital sign parameters of the human body can be detected by using the acoustic characteristics. And the piezoelectric material layer 121 occupies smaller space, which is conducive to the interior space design of smart glasses 100. With the shape structure of the smart glasses 100, the piezoelectric material layer 121 can be arranged to fit to the human skin, reducing the influence of human action on speaker function and vital sign parameters detection.

Figure 2:
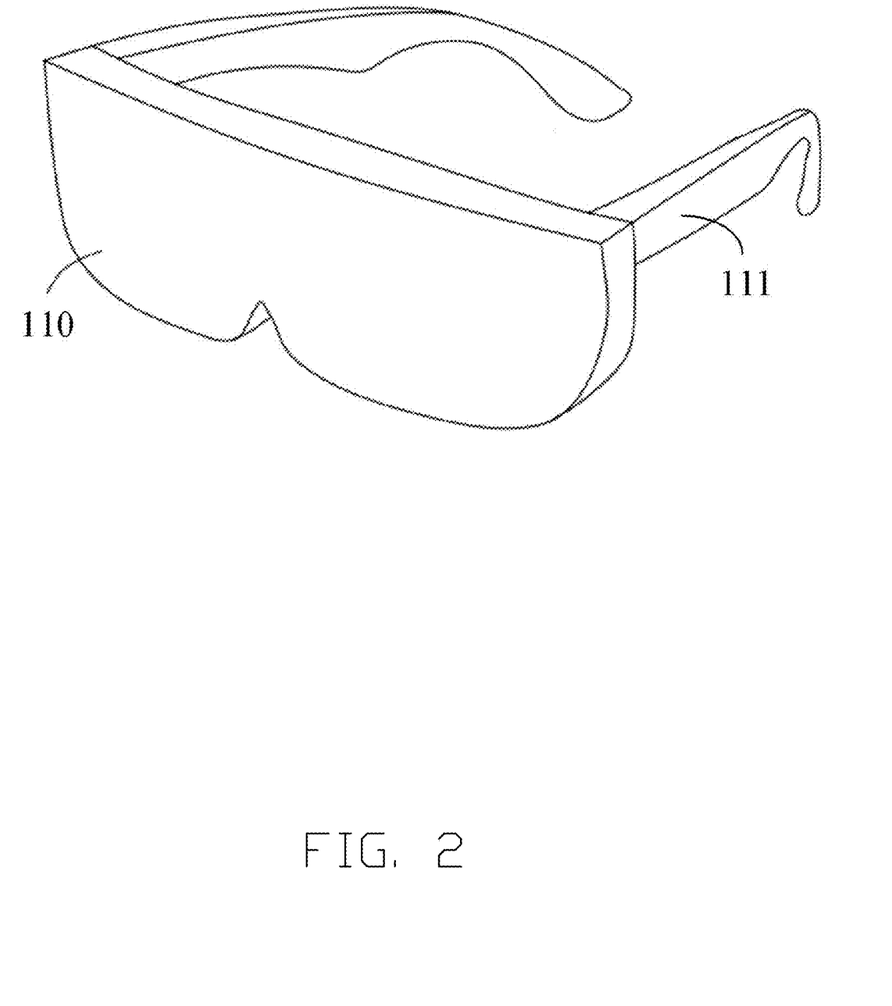
FIG. 2 is a structure diagram of the smart glasses in one embodiment of the present application.

FIG. 2 is a structure diagram of the smart glasses 100 in one embodiment of the present application.

In one embodiment, the glasses body 110 includes glasses legs 111. The vocal unit 120 further includes a wiring layer 122. The wiring layer 122 and the piezoelectric material layer 121 are arranged in the glasses legs 111. The piezoelectric material layer 121 is arranged near an inside of the glasses legs 111. The wiring layer 122 is arranged on a side of the piezoelectric material layer 121 away from the inside of the glasses legs 111. The wiring layer 122 is configured to transmit the drive signals.

The glasses legs 111 can be made of polycarbonate, polyether sulfone resin or aluminum alloy. The wiring layer 122 is arranged between the control unit 140 and the piezoelectric material layer 121, on which conductive wires (e.g. copper) and/or electronic devices (e.g. field-effect transistors, resistors, capacitors, etc.) can be arranged to transmit the drive signals. The piezoelectric material layer 121 is arranged near the inside of the glasses legs 111 to fit with the human skin and reduce the loss of the first acoustic signals and the second acoustic signals transmitted to the human skin. Due to the small size of the piezoelectric material layer 121, the space occupied by the radio unit 160 can be reduced, and the size of the glasses legs 111 can be reduced to achieve the lightweight of the smart glasses 100. In addition, the piezoelectric material layer 121 with small size can be paired with a variety of size chip designs, and has high compatibility. At the frequency of 1000 Hz, the first acoustic signals converted by the piezoelectric material layer 121 can reach 100 dB, which has a good sound quality.

In one embodiment, a length of the piezoelectric material layer 121 is greater than half a length of the glasses legs 111 and less than the length of the glasses legs 111. Thus the piezoelectric material layer 121 can be fitted with the human skin as much as possible, improving the transmission efficiency of the first acoustic signals and the second acoustic signals.

Figure 3:
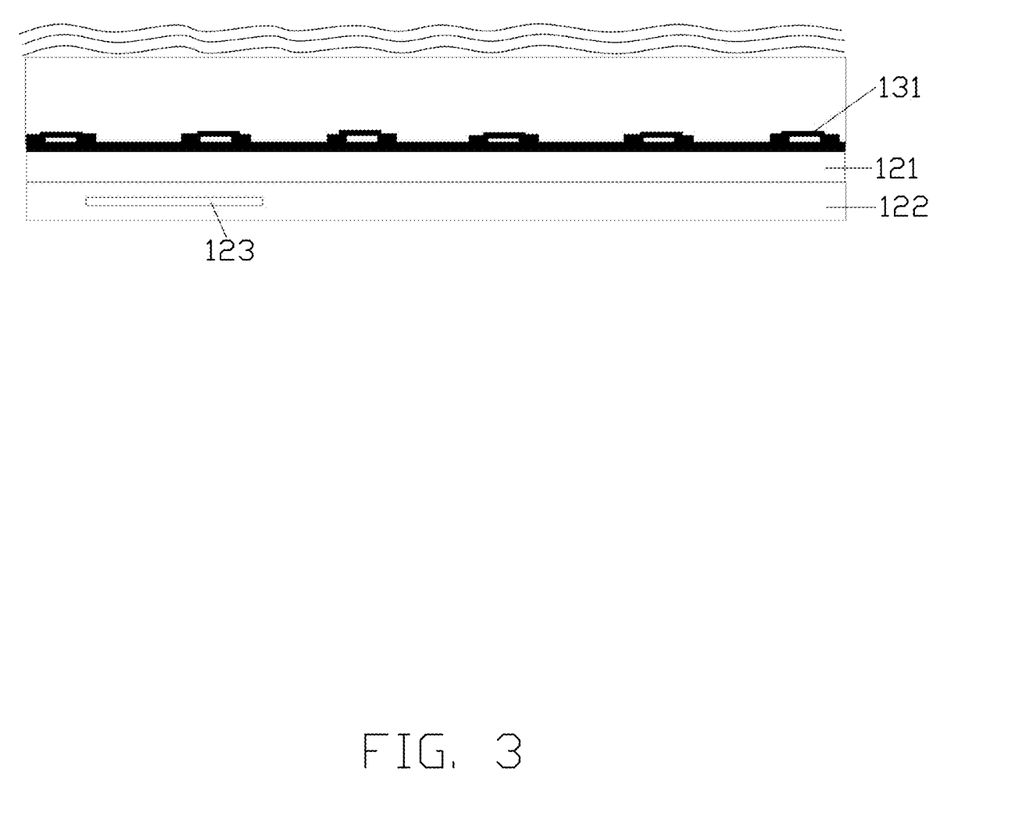
FIG. 3 is a structure diagram of the smart glasses according to an embodiment of the present disclosure.

FIG. 3 is a structure diagram of the smart glasses 100 according to an embodiment of the present disclosure.

In one embodiment, the receiving unit 130 includes a capacitive micro ultrasonic sensor 131. The capacitive micro ultrasonic sensor 131 is arranged on a side of the piezoelectric material layer 121 close to the inside of the glasses legs. The capacitive micro ultrasonic sensor 131 is configured to receive the feedback signals and generate first voltage signals according to the feedback signals. The control unit 140 is configured to determine the vital sign parameters of the human body based on the first voltage signals.

The smart glasses 100 can transmit high-power acoustic signals (e.g. 10~100V) through the piezoelectric material layer 121, and receive feedback signals through the capacitive micro-ultrasonic sensor 131. The human blood vessels can produce feedback signals of different frequencies to the second acoustic signals under different states. The feedback signals acts on the capacitive micro-ultrasonic sensor 131 to generate the corresponding first voltage signals. The control signals can determine the vital sign parameters of human body such as blood pressure and heartbeat according to the first voltage signals. In this way, the vital sign parameters, such as blood pressure and heartbeat, which are difficult to detect directly, can be converted into the first voltage signals which is easy to detect. The capacitive micro ultrasonic sensor 131 has small size, usually with the thickness of 1~10 μm, which is conducive to reducing the size of the receiving unit 130. And the capacitive micro ultrasonic sensor 131 has a low operating voltage, usually 2~5V, which is conducive to reducing the circuit power consumption.

In one embodiment, the receiving unit 130 includes a plurality of capacitive micro ultrasonic sensors 131. The plurality of capacitive micro ultrasonic sensors 131 are sequentially arranged along a length direction of the piezoelectric material layer 121.

By arranging a plurality of capacitive micro-ultrasonic sensors 131 along the length direction of the piezoelectric material layer 121, the area covered by the receiving unit 130 on the human skin can be as much as possible, thereby increasing the receiving area of the feedback signals and improving the detection accuracy of human vital sign parameters.

In one embodiment, the vocal unit 120 further includes a drive circuit 123. The drive circuit 123 is arranged on the wiring layer 122. The drive circuit 123 is configured to receive the drive signals and drive the piezoelectric material layer 121.

Figure 4:
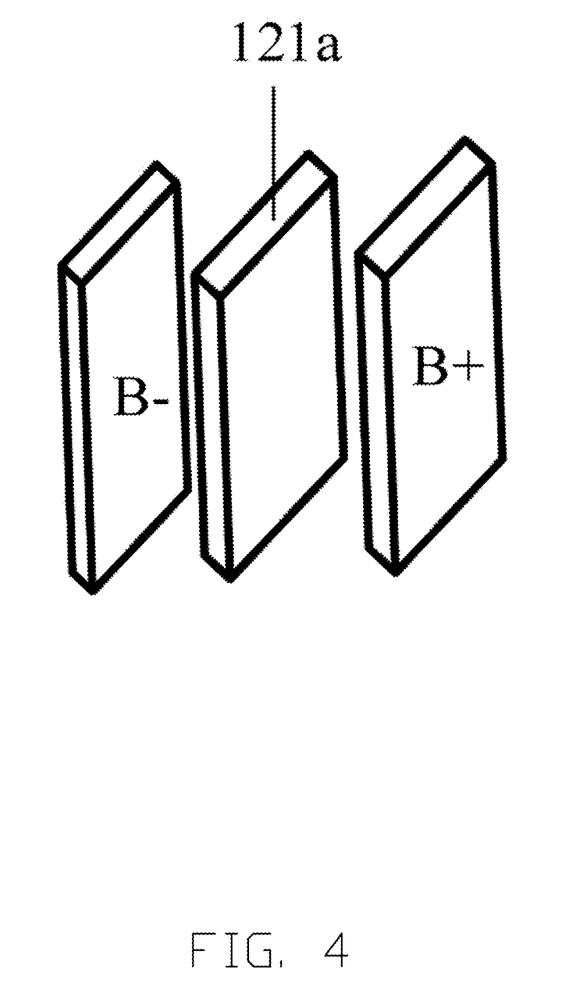
FIG. 4 is a structure diagram of a piezoelectric material layer according to an embodiment of the present disclosure.
Figure 5:
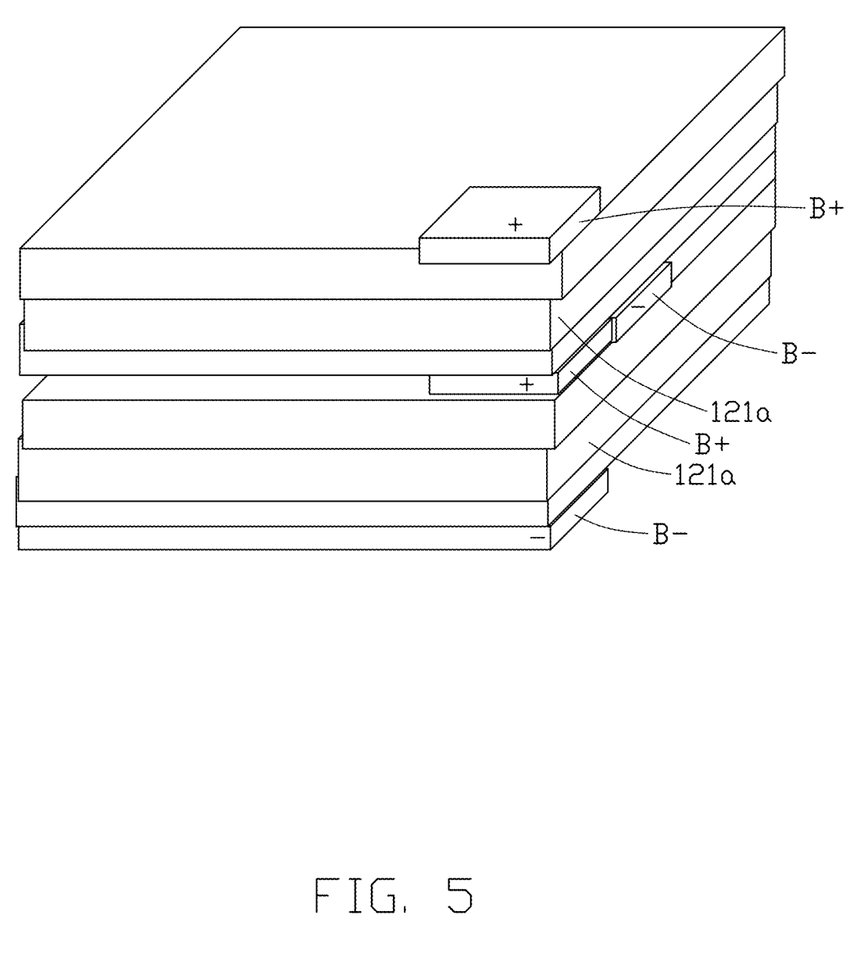
FIG. 5 is a structure diagram of the piezoelectric material layer according to another embodiment of the present disclosure.

FIG. 4 is a structure diagram of a piezoelectric material layer 121 according to an embodiment of the present disclosure. FIG. 5 is a structure diagram of a piezoelectric material layer 121 according to another embodiment of the present disclosure.

In one embodiment, the piezoelectric material layer 121 includes a piezoelectric film 121a, a positive electrode B+, and a negative electrode B−. The positive electrode B+ and the negative electrode B− are arranged on both sides of the piezoelectric film 121*a*.

In one embodiment, the drive circuit 123 can include field effect transistors (FET). The FETs can be controlled to turn on/off by PWM signals output by the control unit 140, and then generate pulse signals to act on the positive electrode B+ and negative electrode B− of the piezoelectric material layer 121, driving the piezoelectric film 121*a* to deform and vibrate, and generate the first acoustic signals or the second acoustic signals. For example, the control unit 140 can control the FETs to turn on/off by output PWM signals with different duty cycles to generate first acoustic signals or second acoustic signals.

In one embodiment, the smart glasses 100 further includes a power circuit 150. The power circuit 150 is electrically connected with the control unit 140 and the drive circuit 123 respectively. The power circuit 150 is configured to receive a power voltage and convert the power voltage into a first voltage to output to the control unit 140, and convert the power voltage into a second voltage to output to the drive circuit 123. The power supply circuit 150 can be include buck circuit and/or boost circuit.

In one embodiment, the smart glasses 100 further includes a radio unit 160. The radio unit 160 is electrically connected with the control unit 140. The radio unit 160 is configured to receive voice signals and convert the voice signals into second voltage signals. The control unit 140 is further configured to determine the information contained in the voice signals based on the second voltage signals.

The radio unit 160 can include a moving-coil microphone or a capacitive microphone. The vibration of the voice signals can be transmitted to the diaphragm of the moving coil microphone, which pushes the magnet inside to form a changing current and generates the corresponding second voltage signals. Or the vibration of the voice signals can be transmitted to the diaphragm of the capacitor mike, and the voltage difference can be generated at both ends of the capacitor, thus generate the corresponding second voltage signals. The control unit 140 can determine the information contained in the voice signals according to the amplitude, frequency, and other information of the second voltage signals, and then determine the sound information to be output according to the information contained in the voice signals, and output the corresponding drive signals to the sound unit 120.

Figure 6:
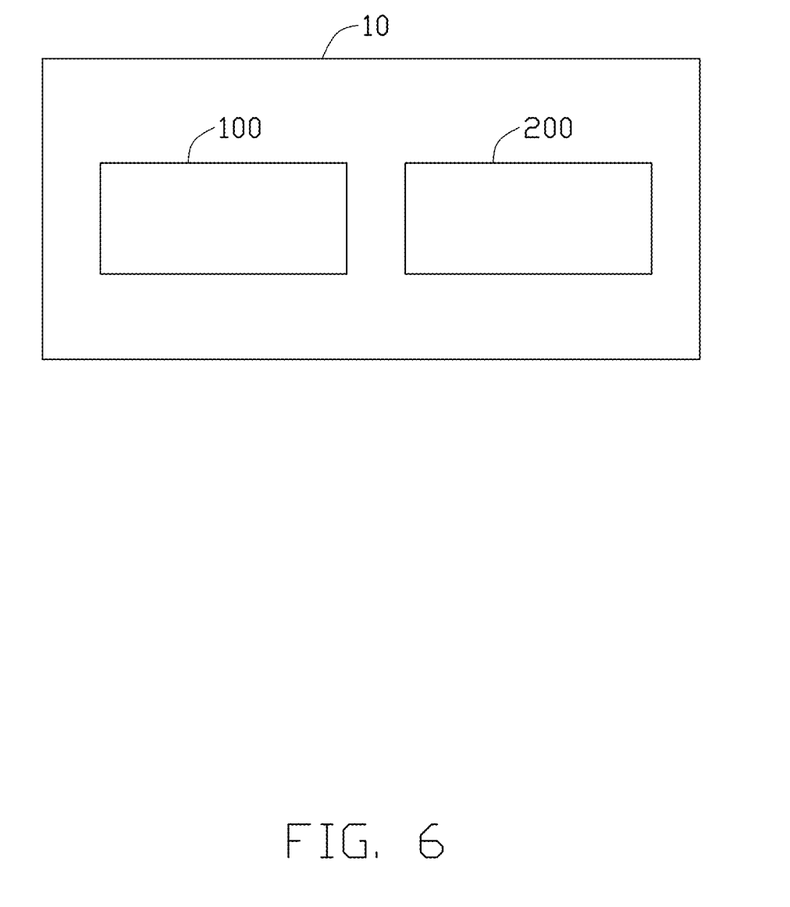
FIG. 6 is a block diagram of a wearable system according to an embodiment of the present disclosure.

FIG. 6 is a block diagram of a wearable system 10 according to another embodiment of the present disclosure. The wearable system 10 includes a smart glasses 100 and a portable device 200. The portable device 200 is communicated with the smart glasses 100. The portable device 200 can be mobile phones, watches, etc. The vital sign parameters of the human body output by the smart glasses 100 can be processed and displayed by the portable device 200. Furthermore, the portable device 200 can transmit the vital sign parameters of the human body to another mobile terminal.

The detailed structure of the smart glasses 100 can be referred to the above embodiments. It can be understood that since the above-mentioned smart glasses 100 are applied in the wearable system 10 of this application, the embodiments of the wearable system 10 of this application includes all the technical solutions of all the embodiments of the above-mentioned smart glasses 100, and the technical effects achieved are exactly the same.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A smart glasses comprising:
a glasses body, the glasses body comprises glasses legs;
a vocal unit arranged in the glasses body, wherein the vocal unit comprises a piezoelectric material layer, the piezoelectric material layer is arranged in the glasses legs, the piezoelectric material layer is arranged near an inside of the glasses legs, the piezoelectric material layer is configured to receive drive signals and convert the drive signals into first acoustic signals and/or second acoustic signals, the second acoustic signals are configured to detect vital sign parameters of a human body, a frequency of the second acoustic signals is greater than a frequency of the first acoustic signals; the first acoustic signals are transmissible to an auditory nerve of the human body through bone conduction, or transmissible to an ear drum of the human body through air, and further transmissible to the auditory nerve through the ear drum;
a receiving unit arranged in the glasses body, wherein the receiving unit is configured to receive feedback signals of the human body with respect to the second acoustic signals; the receiving unit comprises a plurality of capacitive micro ultrasonic sensors, the plurality of capacitive micro ultrasonic sensors is arranged on a side of the piezoelectric material layer closer to an inside of the glasses legs, the plurality of capacitive micro ultrasonic sensors is configured to receive the feedback signals and generate first voltage signals according to the feedback signals, the plurality of capacitive micro ultrasonic sensors are sequentially arranged along a length direction of the piezoelectric material layer; and
a control unit electrically connected with the vocal unit and the receiving unit, wherein the control unit is configured to output the drive signals, the control unit is further configured to determine the vital sign parameters of the human body based on the first voltage signals.

2. The smart glasses of claim 1, wherein the vocal unit further comprises a wiring layer, the wiring layer is arranged in the glasses legs, the wiring layer is arranged on a side of the piezoelectric material layer away from the inside of the glasses legs, the wiring layer is configured to transmit the drive signals.

3. The smart glasses of claim 2, wherein a length of the piezoelectric material layer is greater than half a length of the glasses legs, and less than the length of the glasses legs.

4. The smart glasses of claim 2, wherein the vocal unit further comprises a drive circuit, the drive circuit is arranged on the wiring layer, the drive circuit is configured to receive the drive signals and drive the piezoelectric material layer.

5. The smart glasses of claim 4, wherein the piezoelectric material layer comprises a piezoelectric film, a positive electrode, and a negative electrode, the positive electrode and the negative electrode are arranged on both sides of the piezoelectric film.

6. The smart glasses of claim 4, further comprising a power circuit, wherein the power circuit is electrically connected with the control unit and the drive circuit respectively, the power circuit is configured to receive a power voltage and convert the power voltage into a first voltage to output to the control unit, and convert the power voltage into a second voltage to output to the drive circuit.

7. The smart glasses of claim 1, further comprising a radio unit, wherein the radio unit is electrically connected with the control unit, the radio unit is configured to receive voice signals and convert the voice signals into second voltage signals, the control unit is further configured to determine information contained in the voice signals based on the second voltage signals.

8. The smart glasses of claim 1, further comprising a display device, wherein the control unit is further configured to output display control signals based on the vital sign parameters, the display control signals are configured to control the display device to display the vital sign parameters.

9. A wearable system comprising a smart glasses and a portable device, wherein the portable device communicated with the smart glasses, the smart glasses comprises:
 a glasses body, the glasses body comprises glasses legs;
 a vocal unit arranged in the glasses body, the vocal unit comprises a piezoelectric material layer, the piezoelectric material layer is arranged in the glasses legs, the piezoelectric material layer is arranged near an inside of the glasses legs, the piezoelectric material layer is configured to receive drive signals and convert the drive signals into first acoustic signals and/or second acoustic signals, the second acoustic signals are configured to detect vital sign parameters of a human body, a frequency of the second acoustic signals is greater than a frequency of the first acoustic signals; the first acoustic signals are transmissible to an auditory nerve of the human body through bone conduction, or transmissible to an ear drum of the human body through air, and further transmissible to the auditory nerve through the ear drum;
 a receiving unit arranged in the glasses body, the receiving unit is configured to receive feedback signals of the human body with respect to the second acoustic signals; the receiving unit comprises a plurality of capacitive micro ultrasonic sensors, the plurality of capacitive micro ultrasonic sensors is arranged on a side of the piezoelectric material layer close to an inside of the glasses legs, the plurality of capacitive micro ultrasonic sensors is configured to receive the feedback signals and generate first voltage signals according to the feedback signals, the plurality of capacitive micro ultrasonic sensors are sequentially arranged along a length direction of the piezoelectric material layer; and
 a control unit electrically connected with the vocal unit and the receiving unit, the control unit is configured to output the drive signals, the control unit is further configured to determine the vital sign parameters of the human body based on the first voltage signals;
 wherein the smart glasses is further configured to transmit the vital sign parameters of the human body to the portable device, the portable device is configured to display the vital sign parameters of the human body.

10. The wearable system of claim 9, wherein the vocal unit further comprises a wiring layer, the wiring layer is arranged in the glasses legs, the wiring layer is arranged on a side of the piezoelectric material layer away from the inside of the glasses legs, the wiring layer is configured to transmit the drive signals.

11. The wearable system of claim 10, wherein a length of the piezoelectric material layer is greater than half a length of the glasses legs, and further less than the length of the glasses legs.

12. The wearable system of claim 10, wherein the vocal unit further comprises a drive circuit, wherein the drive circuit is arranged on the wiring layer, the drive circuit is configured to receive the drive signals and drive the piezoelectric material layer.

13. The wearable system of claim 12, wherein the piezoelectric material layer comprises a piezoelectric film, a positive electrode, and a negative electrode, the positive electrode and the negative electrode are arranged on both sides of the piezoelectric material layer.

14. The wearable system of claim 12, wherein the smart glasses further comprises a power circuit, the power circuit is electrically connected with the control unit and the drive circuit respectively, the power circuit is configured to receive a power voltage and convert the power voltage into a first voltage to output to the control unit, and convert the power voltage into a second voltage to output to the drive circuit.

15. The wearable system of claim 9, wherein the smart glasses further comprises a radio unit, the radio unit is electrically connected with the control unit, the radio unit is configured to receive voice signals and convert the voice signals into second voltage signals, the control unit is further configured to determine the information contained in the voice signals based on the second voltage signals.

16. The wearable device of claim 9, wherein the smart glasses further comprises a display device, the control unit is further configured to output display control signals based on the vital sign parameters, the display control signals are configured to control the display device to display the vital sign parameters.

* * * * *